(12) United States Patent
Hirooka et al.

(10) Patent No.: US 11,430,092 B2
(45) Date of Patent: Aug. 30, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Shigeki Hirooka, Kawasaki (JP); Shigeki Mori, Koshigaya (JP)

(73) Assignee: Canon Kabushiki Kaisha, Tokyo (JP)

(*) Notice: Subject to any disclaimer, the term of this patent is extended or adjusted under 35 U.S.C. 154(b) by 280 days.

(21) Appl. No.: 16/598,650

(22) Filed: Oct. 10, 2019

(65) Prior Publication Data

US 2020/0126198 A1 Apr. 23, 2020

(30) Foreign Application Priority Data

Oct. 17, 2018 (JP) .............................. JP2018-196077

(51) Int. Cl.
   *G06T 5/00* (2006.01)
   *G06T 7/70* (2017.01)
   *G06T 5/50* (2006.01)
   *G06V 20/10* (2022.01)

(52) U.S. Cl.
   CPC .............. *G06T 5/009* (2013.01); *G06T 5/50* (2013.01); *G06T 7/70* (2017.01); *G06V 20/188* (2022.01); *G06T 2207/30188* (2013.01)

(58) Field of Classification Search
   CPC .. G06T 5/009; G06T 7/70; G06T 5/50; G06T 2207/30188; G06K 9/00657
   See application file for complete search history.

(56) References Cited

U.S. PATENT DOCUMENTS

| | | | |
|---|---|---|---|
| 6,947,662 B1 | 9/2005 | Shibata | |
| 2010/0232514 A1* | 9/2010 | Nomizo | H04N 21/4143 375/240.24 |
| 2018/0082223 A1* | 3/2018 | Birger | G06Q 50/02 |

FOREIGN PATENT DOCUMENTS

| | | |
|---|---|---|
| JP | 2001-120042 A | 5/2001 |
| JP | 2012-38229 A | 2/2012 |
| JP | 2013-125519 A | 6/2013 |

* cited by examiner

*Primary Examiner* — Myron Wyche
(74) *Attorney, Agent, or Firm* — Canon U.S.A., Inc. IP Division

(57) ABSTRACT

An image processing apparatus includes an acquisition unit configured to acquire images each of which is an image having a first data amount acquired through image-capturing, a detection unit configured to detect an attention target in each of the images, a specification unit configured to specify a geographical range based on a geographical position where the detected attention target exists, and a conversion unit configured to convert an image of at least a part of the images into an image having a second data amount that is smaller than the first data amount according to an inclusion relationship between the specified geographical range and a geographical position where each of the images having the first data amount is acquired.

20 Claims, 14 Drawing Sheets

FIG.4

| ID | IMAGE FILE | POSITION | TYPE OF ATTENTION TARGET |
|---|---|---|---|
| 1 | IMG_0001.jpg | 35.5287850, 139.6910273 | DISEASE A |
| 2 | IMG_0001.jpg | 35.5287850, 139.6910273 | PEST INSECT A |
| 3 | IMG_0002.jpg | 35.5287945, 139.6910324 | DISEASE B |
| ... | ... | ... | ... |
| 101 | IMG_0035.jpg | 35.5291080, 139.6912007 | DISEASE C |
| 102 | IMG_0036.jpg | 35.5291175, 139.6912058 | DISEASE C |
| 103 | IMG_0037.jpg | 35.5291270, 139.6912109 | DISEASE C |

| ID | TYPE OF ATTENTION TARGET | REQUIRED RESOLUTION | RADIUS OF INFLUENCE |
|----|--------------------------|---------------------|---------------------|
| 1  | DISEASE A                | 2400 × 1600         | 3.0 m               |
| 2  | DISEASE B                | 1200 × 800          | 5.0 m               |
| 3  | DISEASE C                | 600 × 400           | 1.0 m               |
| 4  | PEST INSECT A            | 3000 × 2000         | 2.0 m               |
| 5  | PEST INSECT B            | 1800 × 1200         | 5.0 m               |
| ... | ...                     | ...                 | ...                 |

| ID | IMAGE FILE | POSITION | TYPE OF ATTENTION TARGET | DETECTED COORDINATE |
|---|---|---|---|---|
| 1 | IMG_0001.jpg | 35.52877850, 139.6910273 | DISEASE A | 360 |
| 2 | IMG_0001.jpg | 35.52877850, 139.6910273 | PEST INSECT A | 1080 |
| 3 | IMG_0002.jpg | 35.52877945, 139.6910324 | DISEASE B | 720 |
| ... | ... | ... | ... | ... |
| 101 | IMG_0035.jpg | 35.52291080, 139.6912007 | DISEASE C | 180 |
| 102 | IMG_0036.jpg | 35.52291175, 139.6912058 | DISEASE C | 2480 |
| 103 | IMG_0037.jpg | 35.52291270, 139.6912109 | DISEASE C | 1520 |

FIG.10

| ID | IMAGE FILE | TYPE OF END POINT | DETECTED COORDINATE |
|---|---|---|---|
| 1 | IMG_0001.jpg | LEFT END | 10 |
| 2 | IMG_0001.jpg | RIGHT END | 2160 |
| 3 | IMG_0001.jpg | LEFT END | 2600 |
| 4 | IMG_0002.jpg | RIGHT END | 1560 |
| 5 | IMG_0002.jpg | LEFT END | 2000 |
| 6 | IMG_0003.jpg | RIGHT END | 900 |
| ... | ... | ... | ... |

FIG.12

| ID | TYPE OF ATTENTION TARGET | REQUIRED RESOLUTION | NUMBER OF UNIT AREAS OF INFLUENCE |
|---|---|---|---|
| 1 | DISEASE A | 2400 × 1600 | 1 |
| 2 | DISEASE B | 1200 × 800 | 0 |
| 3 | DISEASE C | 600 × 400 | 2 |
| 4 | PEST INSECT A | 3000 × 2000 | 0 |
| 5 | PEST INSECT B | 1800 × 1200 | 1 |
| ... | ... | ... | ... |

IMAGE PROCESSING APPARATUS, IMAGE PROCESSING METHOD, AND STORAGE MEDIUM

BACKGROUND

Field of the Disclosure

The present disclosure relates to an image processing apparatus, an image processing method, and a storage medium for processing images captured continuously.

Description of the Related Art

In a field of agriculture, efforts are being made to grasp a growing condition of crops and damage caused by disease or pest insects by capturing and analyzing images of a farm field or crops. For example, Japanese Patent Application Laid-Open No. 2001-120042 discusses an agricultural vehicle having a video camera and a global positioning system (GPS), which continuously captures images of spot areas in a faun field while moving therein. Thereby, precise image analysis can be executed with respect to a desired area in the farm field.

In order to grasp a growing condition or to find damage caused by disease or a pest insect without fail, images have to be captured at resolution and a frame rate at certain levels or more. However, huge memory capacity will be required if the images are captured at high-resolution and a high frame rate all the time. Therefore, efforts have been made to increase an image-capturing frequency and resolution depending on the object. For example, Japanese Patent Application Laid-Open No. 2012-38229 discusses a dashboard camera which detects a distance and a relative speed to an object (e.g., obstacle). The camera changes frame rates depending on the detected distance and/or the detected relative speed and records images. Accordingly, images captured at the time of a collision accident or sudden approach of an obstacle that can cause a collision accident can be reliably stored.

In the technique described in Japanese Patent Application Laid-Open No. 2012-38229, an image is saved at a high frame rate and high-resolution only at the time of detection of the object or an event (e.g., the collision), or only after detection of the object or the collision. On the other hand, with respect to a growing condition of crops and damage caused by disease or pest insects, which needs to be analyzed in the field of agriculture, if a certain event is detected at one spot, it is required to find out a degree of spread of the event by performing a precise study of a positional range (particularly, two-dimensional range) of its periphery. Accordingly, if attention is simply focused on a temporal range at the time of detection of the object/event or at the time after detection of the object/event as in the case of the conventional technique, information required for the precise study of the positional range of the periphery of the detected event may not be acquired sufficiently. As described above, conventionally, it was difficult to save a high-resolution image suitable for the object or the event that may spread and affect a positional range, or to reduce a data amount of the image.

SUMMARY

The present disclosure describes various embodiments that are directed to an image processing apparatus, an image processing method, and a storage medium which enable a high-resolution image suitable for an object or an event affecting a positional range to be saved and a data amount of the image to be reduced.

According to an aspect of some embodiments, an image processing apparatus includes an acquisition unit configured to acquire a plurality of images each of which is an image having a first data amount acquired through image-capturing, a detection unit configured to detect an attention target in each of the images acquired by the acquisition unit, a specification unit configured to specify a geographical range based on a geographical position where the detected attention target exists, and a conversion unit configured to convert an image of at least a part of the images into an image having a second data amount that is smaller than the first data amount according to an inclusion relationship between the specified geographical range and a geographical position where each of the images having the first data amount is acquired.

Further features of various embodiments will become apparent from the following description of exemplary embodiments with reference to the attached drawings.

BRIEF DESCRIPTION OF THE DRAWINGS

FIG. 4 is a diagram illustrating an example of a detected attention target table according to the first exemplary embodiment.

FIG. 6 is a diagram illustrating an example of a precise investigation specification table according to the first exemplary embodiment.

FIG. 9 is a diagram illustrating an example of a detected attention target table according to the second exemplary embodiment.

FIG. 10 is a diagram illustrating an example of a detected unit area end point table according to the second exemplary embodiment.

FIG. 12 is a diagram illustrating an example of a precise investigation specification table according to the second exemplary embodiment.

DESCRIPTION OF THE EMBODIMENTS

Hereinafter, exemplary embodiments will be described with reference to the appended drawings. Configurations described in the following exemplary embodiments are merely examples, and some embodiments are not limited to the configurations described hereinafter.

In the present exemplary embodiment, a configuration which enables a user in a field of agriculture to grasp a growing condition of crops or damage caused by disease or pest insects by capturing images of a farm field or crops and analyzing the captured images will be described as an example.

Figure 1:
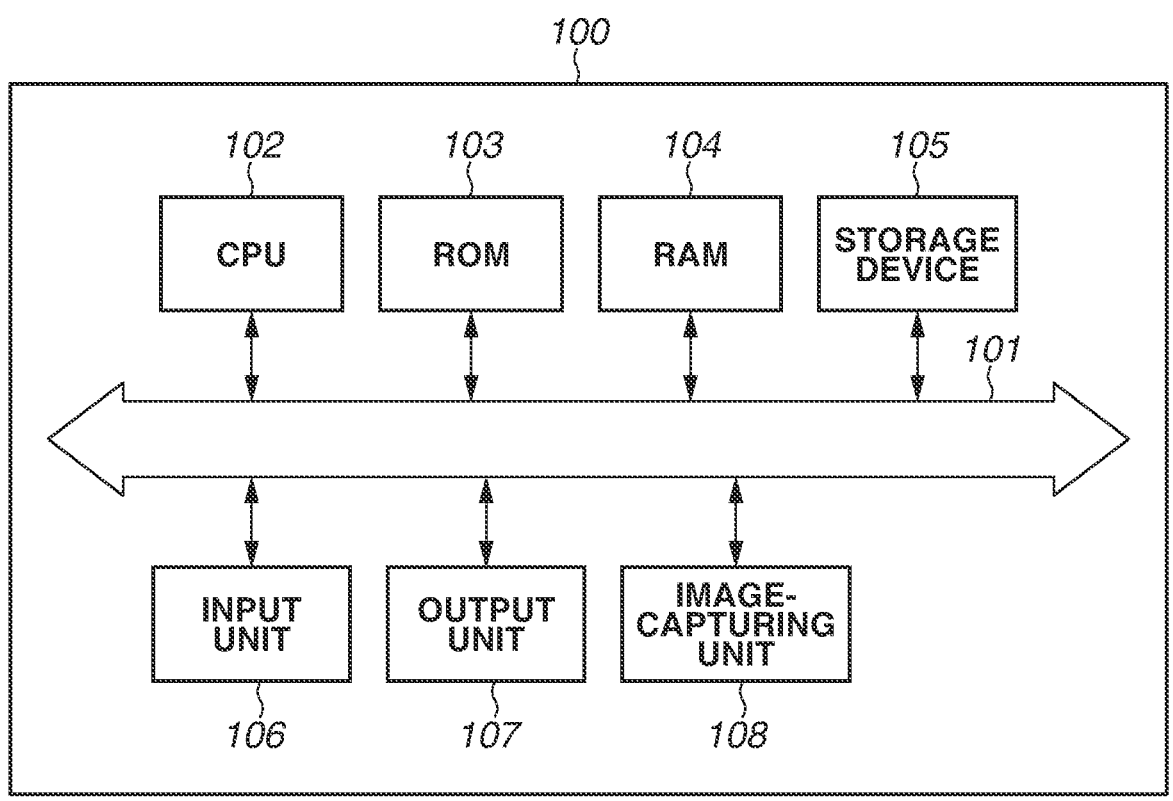
FIG. 1 is a block diagram illustrating an example of a hardware configuration of an image-capturing apparatus according to an exemplary embodiment.

FIG. 1 is a block diagram illustrating an example of a hardware configuration of an image-capturing apparatus 100 described as an application example of the image processing apparatus according to the present exemplary embodiment. The image-capturing apparatus 100 includes a central processing unit (CPU) 102, a read only memory (ROM) 103, a random access memory (RAM) 104, a storage device 105, an input unit 106, an output unit 107, an image-capturing unit 108, and a system bus 101.

The CPU 102 functions as a central processing unit that executes calculation and logical judgement required for executing various types of processing described below. The CPU 102 controls respective constituent elements connected to the system bus 101 for exchanging data and instructions.

A memory that includes a program memory and a data memory is mounted on the image-capturing apparatus 100 according to the present exemplary embodiment. The program memory stores a program which causes the CPU 102 to execute various types of control including processing operations (e.g., steps) described with reference to the flowchart described below. Either the RAM 104 on which the program is loaded from the storage device 105 or the ROM 103 may be used as the program memory.

The storage device 105 is configured of, for example, a hard disk drive (HDD) or a solid state drive (SSD) that stores image data captured by the image-capturing apparatus 100 according to the present exemplary embodiment and a program.

The input unit 106 is configured of, for example, a mouse, a keyboard, or a tablet that allows a user to input information or execute operation.

The output unit 107 is configured of, for example, a display that includes a circuit, such as a graphic controller, for outputting data.

The image-capturing unit 108 includes an imaging optical system (e.g., a lens), an image sensor, such as a complementary metal-oxide semiconductor (CMOS), various sensors, and an image processing circuit, and captures an image of an object. In the present exemplary embodiment, the object is, for example, a farm field or a crop therein.

Figure 2:
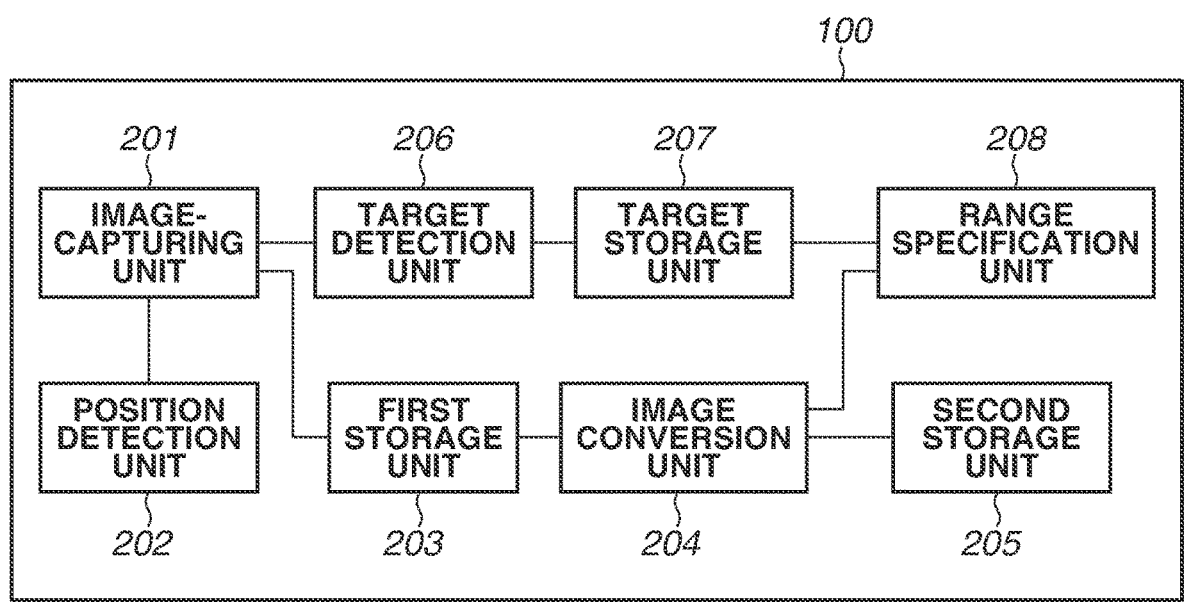
FIG. 2 is a block diagram illustrating an example of a functional configuration of an image-capturing apparatus according to a first exemplary embodiment.

FIG. 2 is a functional block diagram illustrating respective function structures of the image-capturing apparatus 100 according to the present exemplary embodiment. All of the function blocks illustrated in FIG. 2 may be realized either by hardware structures or by software structures, or may be realized by a combination of the hardware structures and the software structures. The same can also be said for a function block of respective exemplary embodiments described below.

An image-capturing unit 201 is a functional unit for capturing an image, and includes the image-capturing unit 108 illustrated in FIG. 1.

A position detection unit 202 is configured to detect an image-capturing position based on a global positioning system (GPS) signal. Although a position acquired based on the GPS signal represents a geographical position, hereinafter, this geographical position is simply referred to as "position".

A first storage unit 203 is configured to temporarily save a captured image acquired by the image-capturing unit 201.

A target detection unit 206 analyzes an image captured by the image-capturing unit 201 and detects an attention target, such as a portion of a crop having a symptom of disease or a pest insect. In the present exemplary embodiment, the target detection unit 206 further serves as a function unit that also acquires a position information of the attention target by using information about an image-capturing position of the captured image. However, the position information of the attention target may be acquired by using position information detected by the position detection unit 202. As details are described below, the target detection unit 206, through image analysis, executes processing for detecting the attention target, which corresponds to a type of attention target registered in a precise investigation specification table 600 in FIG. 6 described below, in a captured image.

The target storage unit 207 is configured to store information about the attention target detected by the target detection unit 206. As details are described below, the target storage unit 207 stores information about the attention target detected by the target detection unit 206 in a detected attention target table.

A range specification unit 208 is a function unit that specifies a positional range (hereinafter, referred to as "influence range") in which a farm field or crops may be affected by the attention target, based on the information about the attention target stored in the target storage unit 207. The range specification unit 208 also serves as a function unit that executes processing for determining a data amount of an image acquired through image conversion executed by the image conversion unit 204. As details are described below, the range specification unit 208 specifies the influence range particularly based on the information about a detected position of the attention target, from among the information about the attention target stored in the target storage unit 207. The detected position of the attention target is a two-dimensional position in the farm field. The range specification unit 208 can specify the influence range and also determine a data amount of the image, based on a type of attention target.

The image conversion unit 204 is a function unit which executes control of reducing a data amount of at least a part of the images saved in the first storage unit 203, based on an inclusion relationship between an acquisition position of the image saved in the first storage unit 203 and a positional range specified by the range specification unit 208. In the present exemplary embodiment, if the acquisition position of the image saved in the first storage unit 203 is not included in the range specified by the range specification unit 208, the image conversion unit 204 executes image conversion processing of, for example, reducing a data amount by reducing the resolution of the image. In the present exemplary embodiment, an image-capturing position where the image is captured is taken as a position where the image is acquired. However, position information acquired by analyzing a position of a captured object can also be used as the position. For example, when a captured image acquired by the image-capturing unit 201 has a first data amount, the image is converted to an image having a second data amount which is smaller than the first data amount through the image conversion processing executed by the image conversion unit 204.

A second storage unit 205 is configured to save an image that the image conversion unit 204 has converted from the image saved in the first storage unit 203 as required.

Figure 3:
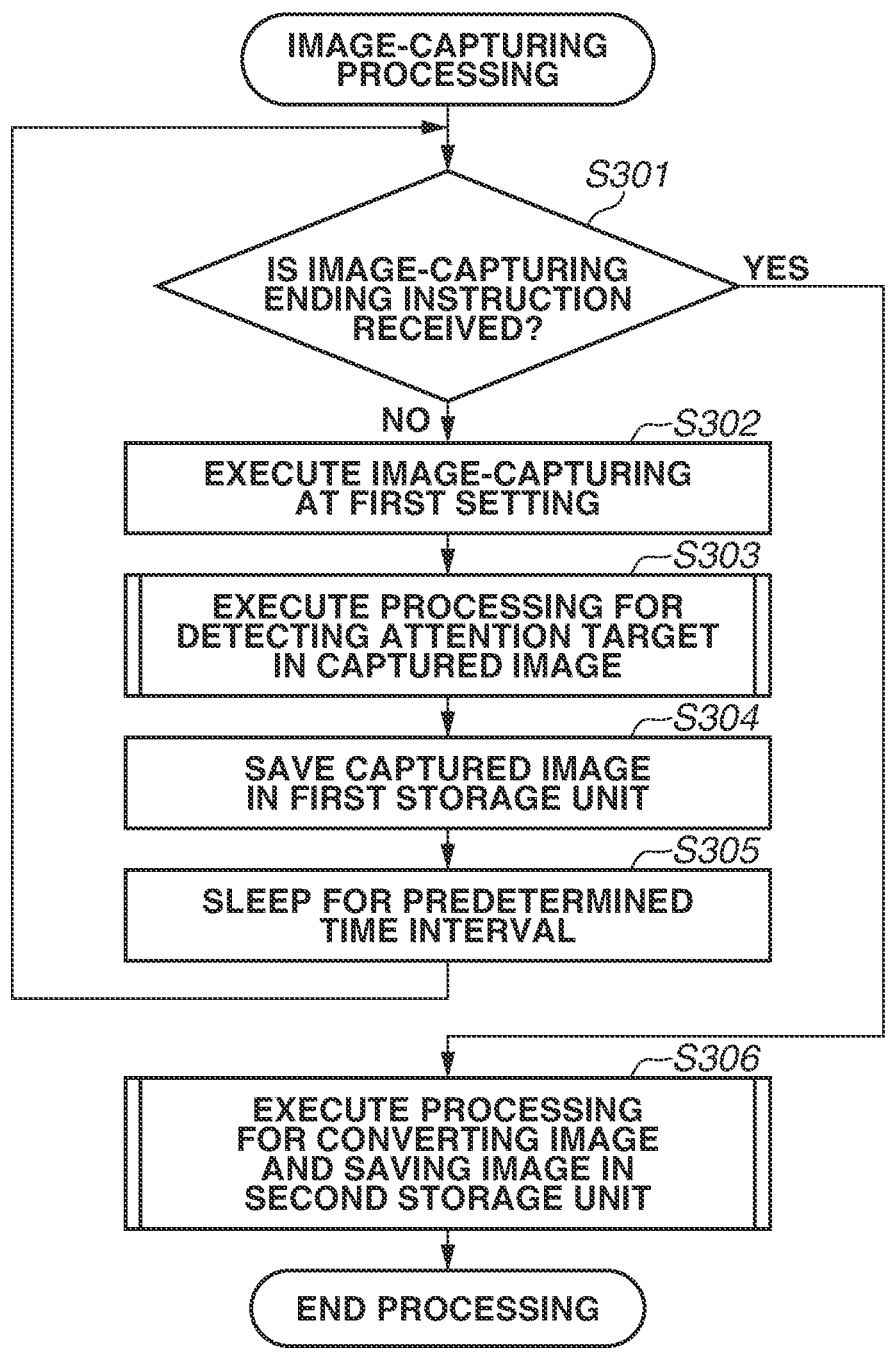
FIG. 3 is a flowchart illustrating image-capturing processing executed by the image-capturing apparatus.

FIG. 3 is a flowchart illustrating an example of the image-capturing processing executed by the image-capturing apparatus 100 according to the present exemplary embodiment.

First, in S301, the CPU 102 determines whether ending of image-capturing is instructed from the user via the input unit 106. If the CPU 102 determines that ending of image-capturing is instructed (YES in S301), the processing proceeds to S306 described below. If the CPU 102 determines that ending of image-capturing is not instructed (NO in S301), the processing proceeds to S302. Herein, an image-capturing ending instruction is a predetermined operation input by the user when image-capturing is ended, for example with respect to all of crops existing in all or a part of a range in a farm field defined as an investigation target.

In S302, the image-capturing unit 201 sets image-capturing resolution to a first setting and executes image-capturing. In the present exemplary embodiment, the resolution according to the first setting is the highest resolution from among the resolution required for conducting precise investigation on each attention target of a type registered in the precise investigation specification table 600 described below.

In S303, the target detection unit 206 executes processing for detecting an attention target in the captured image. The target detection unit 206 then stores information about the detected attention target into a detected attention target table 400 illustrated in FIG. 4. The processing executed in S303 will be described below in detail.

In S304, the first storage unit 203 stores the captured image. In other words, the image to which the resolution is set in S302, which has been captured by the image-capturing unit 201, is saved in the first storage unit 203.

In S305, the CPU 102 enters a sleep mode for a predetermined image-capturing interval, and returns the processing to S301.

When the CPU 102 advances the processing to S306 after determining that ending of image-capturing is instructed in S301, the CPU 102 converts the image saved in the first storage unit 203 through the image conversion unit 204 as required. The CPU 102 then stores the converted image into the second storage unit 205, and ends the processing of the flowchart. The processing executed in S306 will be described below in detail.

FIG. 4 is a conceptual diagram illustrating an example of a data structure of the detected attention target table 400 storing information about the attention target detected in S303 by the target detection unit 206.

As illustrated in FIG. 4, information about an attention target, such as a symptom of disease or a pest insect type detected in the captured image through image analysis executed by the target detection unit 206, is stored in each row of the detected attention target table 400.

In a column 401 of the detected attention target table 400, an attention target identifier (ID) for individually identifying each of the detected attention targets is stored. In a column 402, an image file name of a captured image from which each of the attention targets is detected is stored. In a column 403, information indicating a position where a detected attention target exists is stored. In a column 404, information about a type of the detected attention target is stored. As illustrated in the example in FIG. 4, there is a case where a plurality of attention targets is detected in a single captured image. In the present exemplary embodiment, since image-capturing is executed in proximity to crops, a position of the attention target is approximated by the position information (e.g., GPS information) of the image-capturing apparatus 100 when image-capturing is executed. The detected attention target table 400 is temporary data that is initialized every time a series of image-capturing processing is executed on an object, such as a farm field, and any information about the attention target is not stored when the table is initialized. The detected attention target table 400 is stored in the RAM 104 or the storage device 105, and is deleted when a series of image-capturing processing ends.

Figure 5:
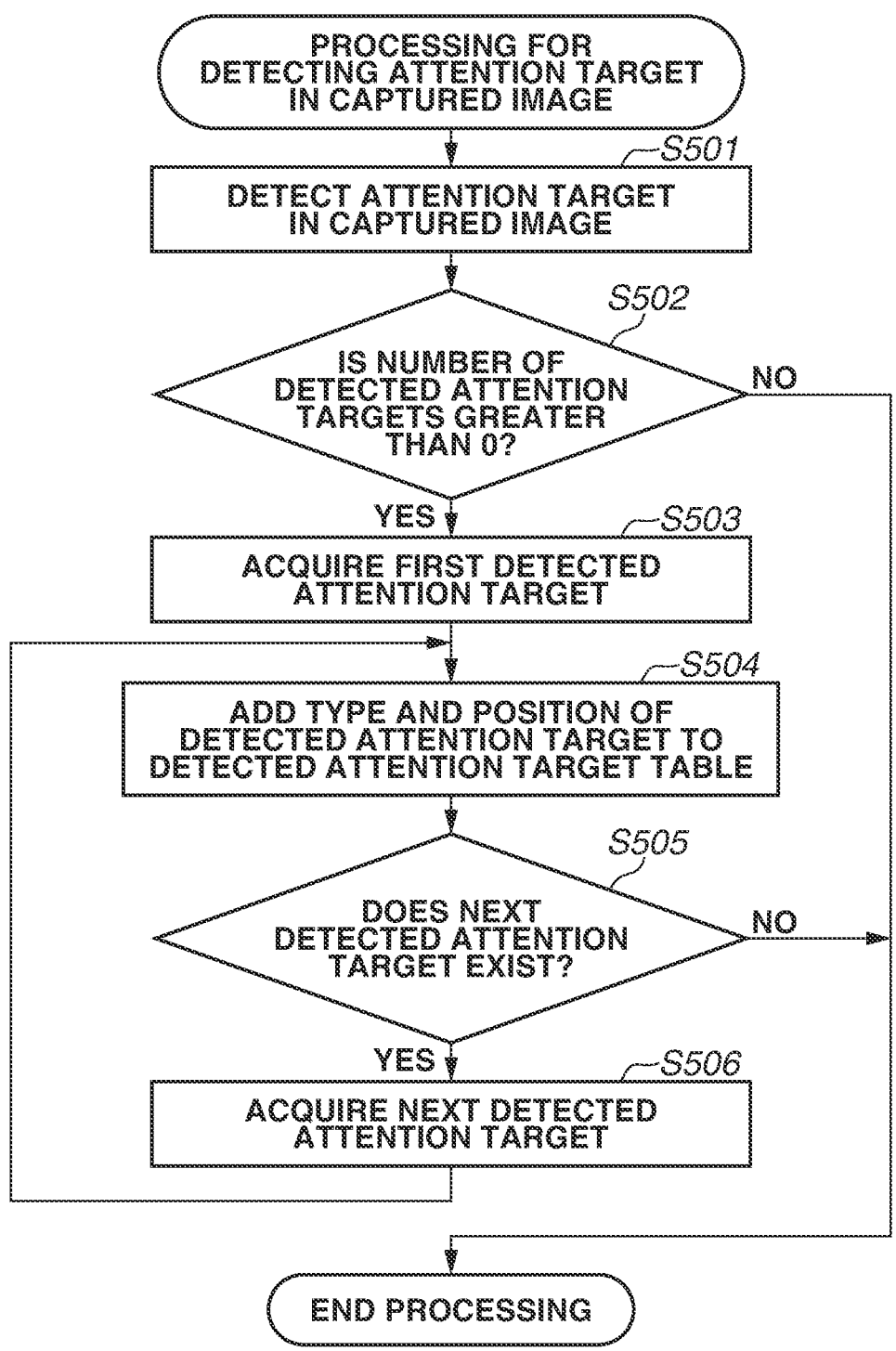
FIG. 5 is a flowchart illustrating attention target detection processing according to the first exemplary embodiment.

FIG. 5 is a flowchart illustrating an example of the processing, which is executed by the target detection unit 206 in S303 of FIG. 3, to detect an attention target in a captured image.

In S501, the target detection unit 206 detects attention targets of all types in the captured image through a method, such as deep-learning and pattern recognition.

In S502, the target detection unit 206 determines whether one or more detected attention targets exist. If no attention target exists (NO in S502), the target detection unit 206 ends the processing of the flowchart. If one or more attention targets exist (YES in S502), the processing proceeds to S503.

In S503, the target detection unit 206 acquires information about the attention target detected first.

In S504, the target detection unit 206 adds the information about the first attention target to the detected attention target table 400 described above. Specifically, with respect to one row corresponding to this attention target, the target detection unit 206 stores an identifier of the attention target into a column 401, an image file name of the attention target into a column 402, an image-capturing position of the image of the attention target into a column 403, and a type of the attention target into a column 404, respectively.

In S505, the target detection unit 206 determines whether a next attention target (an attention target whose information has not been added to detected attention target table 400) detected in the captured image still exists. If the next attention target still exists (YES in S505), the processing proceeds to S506. If no next attention target exists (NO in S505), the processing of this flowchart ends.

In S506, the target detection unit 206 acquires information about the next attention target, and returns the processing to S504.

FIG. 6 is a conceptual diagram illustrating an example of a data structure of the precise investigation specification table 600 according to the present exemplary embodiment.

As illustrated in FIG. 6, information about a specification of the captured image required for conducting precise investigation on each attention target (e.g., a portion of a crop having a symptom of disease or a pest insect type detected by the target detection unit 206) is stored in each row of the precise investigation specification table 600.

A specification identifier (ID) for individually identifying the specification of the image required for conducting precise investigation in the future is stored in a column 601 of the precise investigation specification table 600. Information about a type of each attention target is stored in a column 602. Information about a resolution of the image is stored in a column 603. This information is required for conducting precise investigation when the attention target of a type stored in the column 602 is detected. In a column 604, information about a radius of a range that should be investigated precisely is stored. The information indicates an influence range which is likely to be affected by the attention target of a type stored in the column 602 (e.g., type of disease or a pest insect). As described above, the information stored in the precise investigation specification table 600 is fixed data prepared in advance before image-capturing processing is executed. The precise investigation specification table 600 is stored in, for example, the ROM 103, the RAM 104, and the storage device 105.

Figure 7:
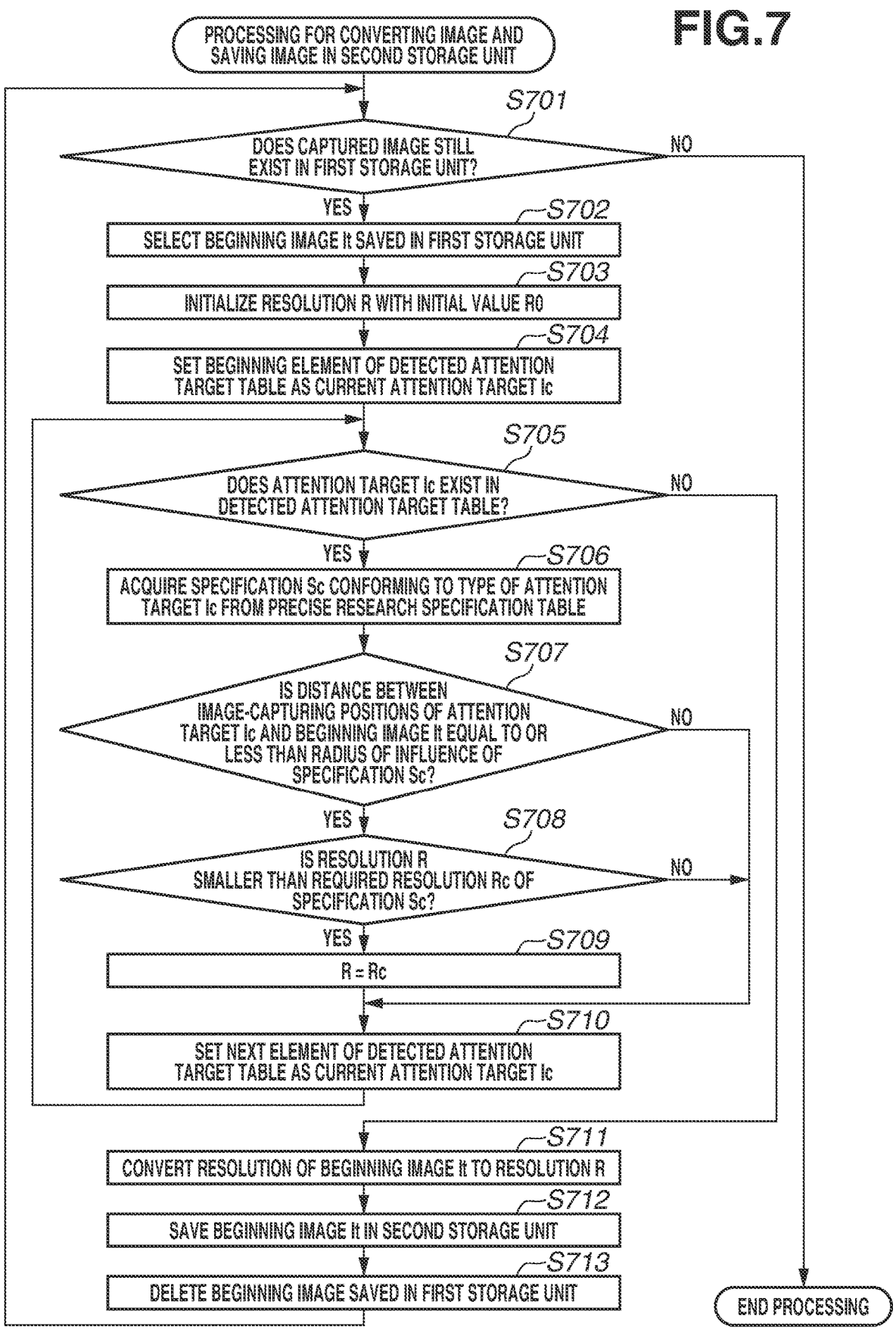
FIG. 7 is a flowchart illustrating image saving processing executed between storage units according to the first exemplary embodiment.

FIG. 7 is a flowchart illustrating an example of processing for converting the captured image temporarily saved in the first storage unit 203 according to the present exemplary embodiment through the image conversion unit 204 as necessary, and for saving the converted image in the second storage unit 205.

In S701, the image conversion unit 204 determines whether the captured image exists in the first storage unit 203. If the image conversion unit 204 determines that the captured image does not exist in the first storage unit 203 (NO in S701), the processing of this flowchart ends. If the image conversion unit 204 determines that the captured image exists (YES in S701), the processing proceeds to S702.

In S702, the image conversion unit 204 selects an image $I_t$ at the beginning of the captured images (specifically, an image captured on the older date/time) stored in the first storage unit 203.

In S703, the image conversion unit 204 initializes resolution R, which is used for saving the image $I_t$ in the second storage unit 205, with low resolution $R_0$ that is used when the image $I_t$ is sufficiently away from, and is not affected by, any of the attention targets detected by the target detection unit 206.

In S704, the image conversion unit 204 sets a beginning element of an attention target group detected in captured images and stored in the above-described detected attention target table 400 as a current attention target $I_c$.

In S705, the range specification unit 208 determines whether information about the attention target $I_c$ exists in the above-described detected attention target table 400. If the range specification unit 208 determines that the information about the attention target $I_c$ does not exist in the detected attention target table 400 (NO in S705), the processing proceeds to S711 described below. If the range specification unit 208 determines that information about the attention target $I_c$ exists in the detected attention target table 400 (YES in S705), the processing proceeds to S706.

In S706, the range specification unit 208 acquires, from the above-described precise investigation specification table 600 information about a precise investigation specification $S_c$ that conforms to the type of the attention target $I_c$ stored in the column 404 of the detected attention target table 400.

In S707, the range specification unit 208 calculates a distance between an image-capturing position of the captured image where the attention target $I_c$ is detected and an image-capturing position of the beginning image $I_t$ stored in the first storage unit 203 using the position information about both of the images. Then, the range specification unit 208 determines whether the distance is equal to or less than a radius of the influence range where precise investigation should be conducted based on the precise investigation specification $S_c$. Then, if the range specification unit 208 determines that the distance is equal to or less than the radius (YES in S707), the processing proceeds to S708. If the range specification unit 208 determines that the distance is greater than the radius (NO in S707), the processing proceeds to S710 described below.

In S708, the range specification unit 208 determines whether the resolution R for saving the image existing in the first storage unit 203 in the second storage unit 205 is smaller than the required resolution $R_c$ described in the precise investigation specification Se. If the range specification unit 208 determines that the resolution R is smaller (lower) than the required resolution $R_c$ (YES in S708), the processing proceeds to S709. If the range specification unit 208 determines that the resolution R is not smaller than the required resolution $R_c$ (NO in S708), the processing proceeds to S710.

In S709, the range specification unit 208 sets the required resolution $R_c$ as the new resolution R with respect to the image conversion unit 204, and advances the processing to S710.

In S710, the image conversion unit 204 sets a next element of the attention target detected in the captured image stored in the detected attention target table 400 as the current attention target $I_c$, and the processing returns to S705.

If the processing proceeds to S711 from S705, the image conversion unit 204 converts the above-described image $I_t$ into an image having the resolution R. Then, in S712, the image conversion unit 204 saves the converted image $I_t$ in the second storage unit 205.

In S713, the image conversion unit 204 deletes the beginning image $I_t$ in the first storage unit 203, and the processing returns to S701.

As described above, according to the image-capturing apparatus 100 according to the first exemplary embodiment, in a case where a symptom of disease or a pest insect is detected in a captured image, images captured within the influence range of the detected disease or the pest insect can be saved at higher resolution depending on the type of disease or pest insect. On the other hand, the rest of the captured images are converted to images having lower resolution, so that a required memory capacity can be reduced.

In the present exemplary embodiment, the resolution is converted depending on a symptom of disease or a type of pest insect. However, a required memory capacity may be reduced, for example, by changing an interval time between the captured images by decimating the captured images. Further, both of conversion of resolution and decimation of images may also be executed.

In the above-described first exemplary embodiment, resolution of the saved image is determined based on a distance from the attention target.

Herein, depending on the type of attention target, it is assumed that a degree of risk is different in one crop from which the attention target is detected and a crop next to the one crop even though a distance from a detection position of the attention target is the same. Accordingly, determining a range requiring more precise images (e.g., images of higher resolution) only based on a distance as described in the first exemplary embodiment may not always be appropriate. In a second exemplary embodiment, a range which requires a more precise image is determined based on a number of unit area counted from the attention target, e.g., a serial number of crop unit counted from a crop from which the attention target has been detected. A hardware configuration of the image-capturing apparatus 100 and the image-capturing processing according to the present exemplary embodiment are similar to those of the above-described first exemplary embodiment, so that illustration or description thereof will be omitted.

Figure 8:
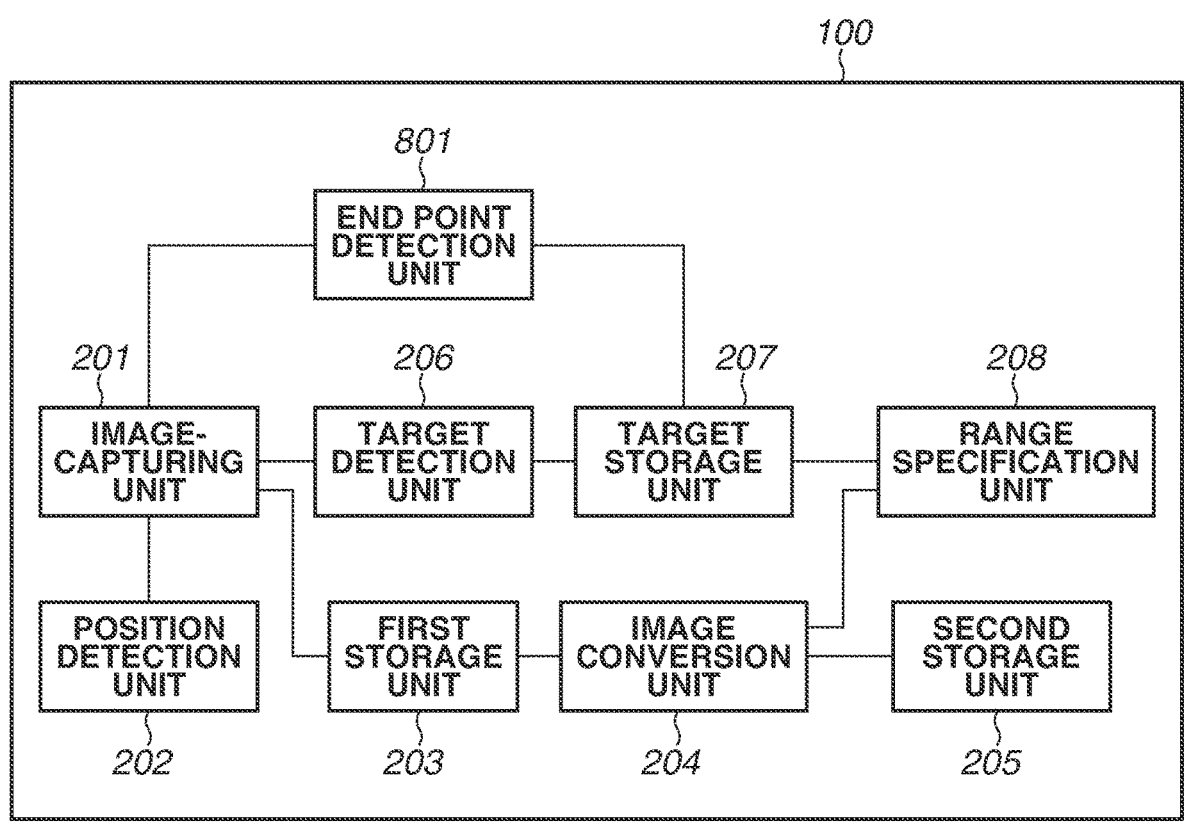
FIG. 8 is a block diagram illustrating an example of a functional configuration of an image-capturing apparatus according to a second exemplary embodiment.

FIG. 8 is a functional block diagram illustrating respective function structures of the image-capturing apparatus 100 according to the present exemplary embodiment. In the functional block diagram of FIG. 8, the same reference numerals are applied to function units similar to those described in FIG. 2, and description thereof will be omitted.

In FIG. 8, the image-capturing apparatus 100 further includes an end point detection unit 801. The end point detection unit 801 analyzes an image captured by the image-capturing unit 201, recognizes crops and an object that defines a boundary between sections of a farm field, and detects an end point of a unit area, such as the crops or the sections, in the captured image. The end point detection unit 801 then stores information indicating the end point of the detected unit area into a detected unit area end point table 1000 described below in FIG. 10.

FIG. 9 is a conceptual diagram illustrating an example of a data structure of a detected attention target table 900 according to the present exemplary embodiment. In the detected attention target table 900 according to the present exemplary embodiment, the same reference numerals are applied to rows similar to those described in FIG. 4, and description thereof will be omitted.

In the detected attention target table 900 illustrated in FIG. 9, information indicating a coordinate in a horizontal direction from a left end in the image of a detected attention target is stored in a column 901. In other words, in the present exemplary embodiment, in addition to the information described in the first exemplary embodiment, the target detection unit 206 acquires information indicating a coordinate in a horizontal direction from a left end in the image of a detected attention target, and stores that information in the detected attention target table 900 as the information about an attention target.

FIG. 10 is a conceptual diagram illustrating an example of a data structure of a detected unit area end point table 1000 according to the present exemplary embodiment.

As illustrated in FIG. 10, information about an end point of a unit area, such as crops detected in a captured image, is stored in each row of the detected unit area end point table 1000.

An identifier (ID) of a detected unit area end point is stored in a column 1001 of the detected unit area end point table 1000. A file name of an image from which the unit area end point is detected is stored in a column 1002. Information about a type (e.g., a left end or a right end) of the detected unit area end point is stored in a column 1003. A coordinate of the detected unit area end point in the image is stored in a column 1004. As illustrated in the detected unit area end point table 1000, a plurality of unit area end points may be detected in a single captured image. The detected unit area end point table 1000 is temporary data generated for a series of image-capturing processing, and thus information about the detected unit area end point is not stored when the table is generated. The detected unit area end point table 1000 is saved in the RAM 104 or the storage device 105, and deleted when a series of image-capturing processing ends.

Figure 11:
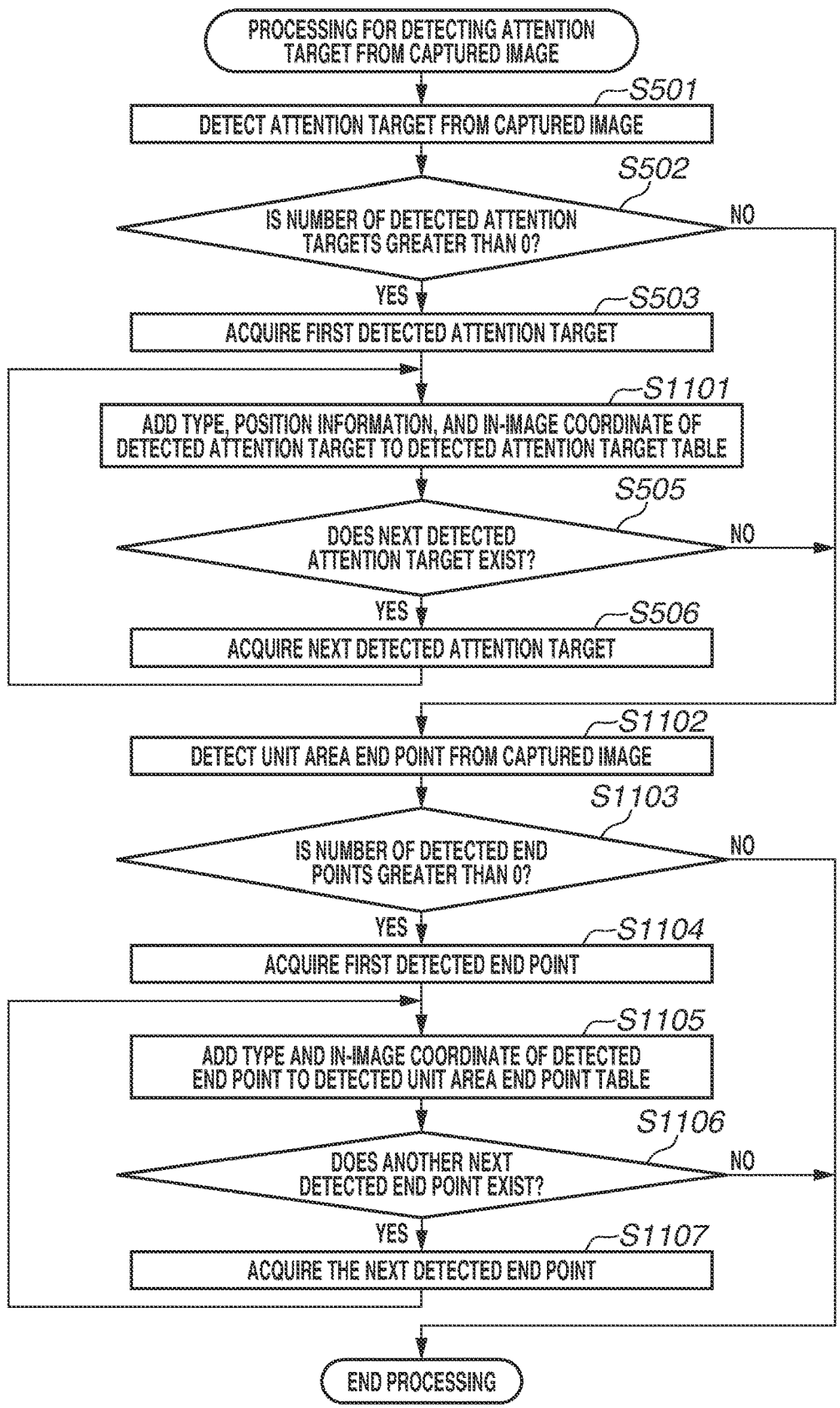
FIG. 11 is a flowchart illustrating attention target detection processing according to the second exemplary embodiment.

FIG. 11 is a flowchart illustrating an example of processing for detecting an attention target in a captured image according to the present exemplary embodiment. In the flowchart of FIG. 11, the processing in S501 to S503, S505, and S506 is similar to the corresponding processing in the above-described flowchart illustrated in FIG. 5, so that description thereof will be omitted. In the flowchart of FIG. 11, the processing proceeds to S1101 from S503, and the processing proceeds to S505 from S1101. If it is determined that no attention target exists in S502 (NO in S502), or if it is determined that no more attention targets exist in S505 (NO in S505), the processing proceeds to S1102.

In S1101, the target detection unit 206 executes the processing similar to that of S504, and further detects a coordinate in a horizontal direction, which takes a left end in the image of the detected attention target as a reference in this example Information about the coordinate in the horizontal direction is then stored in the column 901 of the detected attention target table 900.

In S1102, the end point detection unit 801 detects the unit area end point in the captured image through a method such as deep-learning or object recognition.

In S1103, the end point detection unit 801 determines whether one or more detected end points exist. If one or more detected end points of the unit area exist (YES in S1103), the processing proceeds to S1104. If the end point does not exist (NO in S1103), the processing of the flowchart ends.

In S1104, the end point detection unit 801 acquires information about the end point detected first.

In S1105, the end point detection unit 801 adds information about the acquired end point to the detected unit area end point table 1000. At this time, the end point detection unit 801 writes an identifier (ID) of the newly-detected end point of the unit area in the column 901, a file name of the image of the attention target from which the end point is detected in the column 902, a type of the end point in the column 903, and a coordinate of the end point in the image in the column 904.

In S1106, the end point detection unit 801 determines whether another next detected end point of the unit area still exists. If the end point detection unit 801 determines that another next end point still exists (YES in S1106), the processing proceeds to S1107. If the end point detection unit 801 determines that no other next end point exists (NO in S1106) the processing of the flowchart ends.

In S1107, the end point detection unit 801 acquires information about the next detected end point, and returns the processing to S1105.

FIG. 12 is a conceptual diagram illustrating an example of a data structure of a precise investigation specification table 1200 according to the present exemplary embodiment. In the precise investigation specification table 1200 according to the present exemplary embodiment, reference numerals the same as those used in FIG. 6 are applied to columns similar to those described in FIG. 6, and description thereof will be omitted.

The precise investigation specification table 1200 in FIG. 12 includes a column 1201 instead of the column 604 in FIG. 6. The number of unit areas of the influence range is registered in the column 1201. When an attention target of a corresponding type is detected, the unit areas of that number should be investigated precisely. When the number of unit areas of the influence range which should be investigated precisely is zero, this indicates that the influence range is limited to the crop in which the attention target is detected. When the number of unit areas is one or more, this indicates that the adjacent unit areas of that number also should be investigated precisely. Similar to the above-described precise investigation specification table 600, the precise investigation specification table 1200 is fixed data prepared in advance before image-capturing processing is executed. The precise investigation specification table 1200 is stored in, for example, the ROM 103, the RAM 104, and the storage device 105.

Figure 13:
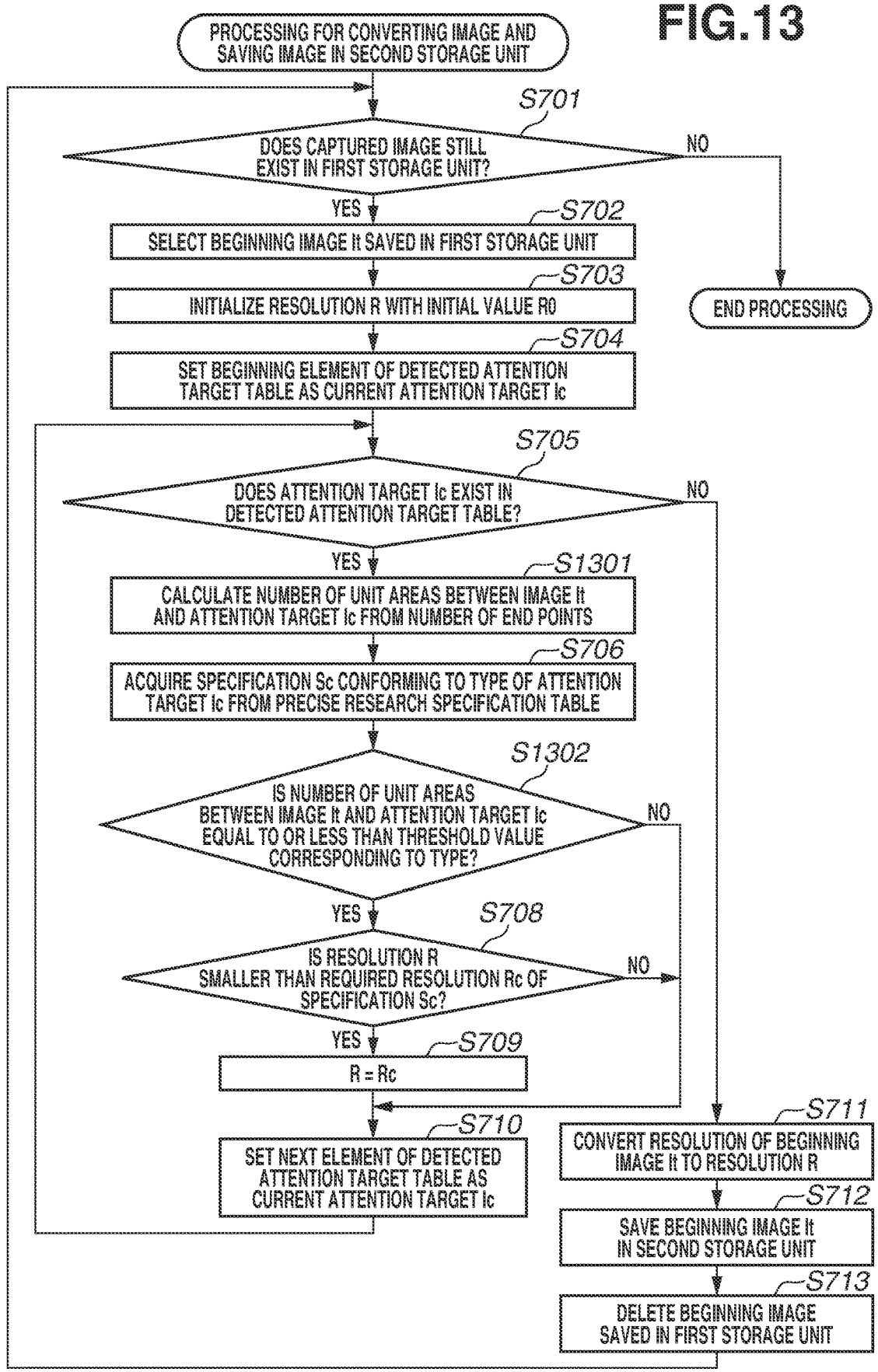
FIG. 13 is a flowchart illustrating image saving processing executed between storage units according to the second exemplary embodiment.

FIG. 13 is a flowchart illustrating an example of processing for converting the image saved in the first storage unit 203 through the image conversion unit 204 as necessary, and for saving the converted image in the second storage unit 205, according to the present exemplary embodiment. In the flowchart illustrated in FIG. 13, the processing in S701 to S706 and in S708 to S713 is similar to the corresponding processing of the flowchart in FIG. 7, so that descriptions thereof will be omitted. In the flowchart illustrated in FIG.

13, when existence of the information about the attention target $I_c$ in the detected attention target table 900 is determined (YES in S705), the processing proceeds to S1301. The processing then proceeds to S706 from S1301. After S706, the processing proceeds to S1302. Details of the processing executed when the processing proceeds to S708 and S710 from S1302 will be described below.

In S1301, the range specification unit 208 calculates the number of unit areas existing between the image-capturing position of the captured image in which the current attention target $I_c$ is detected and the image-capturing position of the beginning image $I_f$ stored in the first storage unit 203. By using the information about the end point registered in the detected unit area end point table 1000, the number of unit areas is calculated by adding up the number of end points included in images captured at image-capturing positions existing between the image-capturing position of the image where the attention target $I_c$ is detected and the image-capturing position of the image $I_f$.

In S1302, the range specification unit 208 determines whether the number of unit areas existing between the image-capturing positions of the captured image of the attention target $I_c$ and the beginning image $I_f$, which is stored in the first storage unit 203, is equal to or less than a threshold value of the number of unit areas of the influence range to be investigated precisely, which is described in the precise investigation specification Sc. If the number of unit areas is equal to or less than the threshold value of the number of unit areas of the influence range to be investigated precisely (YES in S1302), the processing proceeds to S708. If the number of unit areas is greater than the number of unit areas of the influence range to be investigated precisely (NO in S1302), the processing proceeds to S710.

As described above, according to the image-capturing apparatus 100 according to the present exemplary embodiment, a range which requires a more precise image can be specified based on a number of unit area counted from the attention target, e.g., a number of crop unit counted from a crop the attention target has been detected.

As described above, in the image-capturing apparatus 100 according to the first or the second exemplary embodiment, a range which requires more precise images can be specified, and thus precise investigation can be conducted in that range by acquiring the images with high-resolution. On the other hand, in a range other than the range that requires more precise images, an amount of saved data can be reduced by saving the images at low-resolution.

Figure 14:
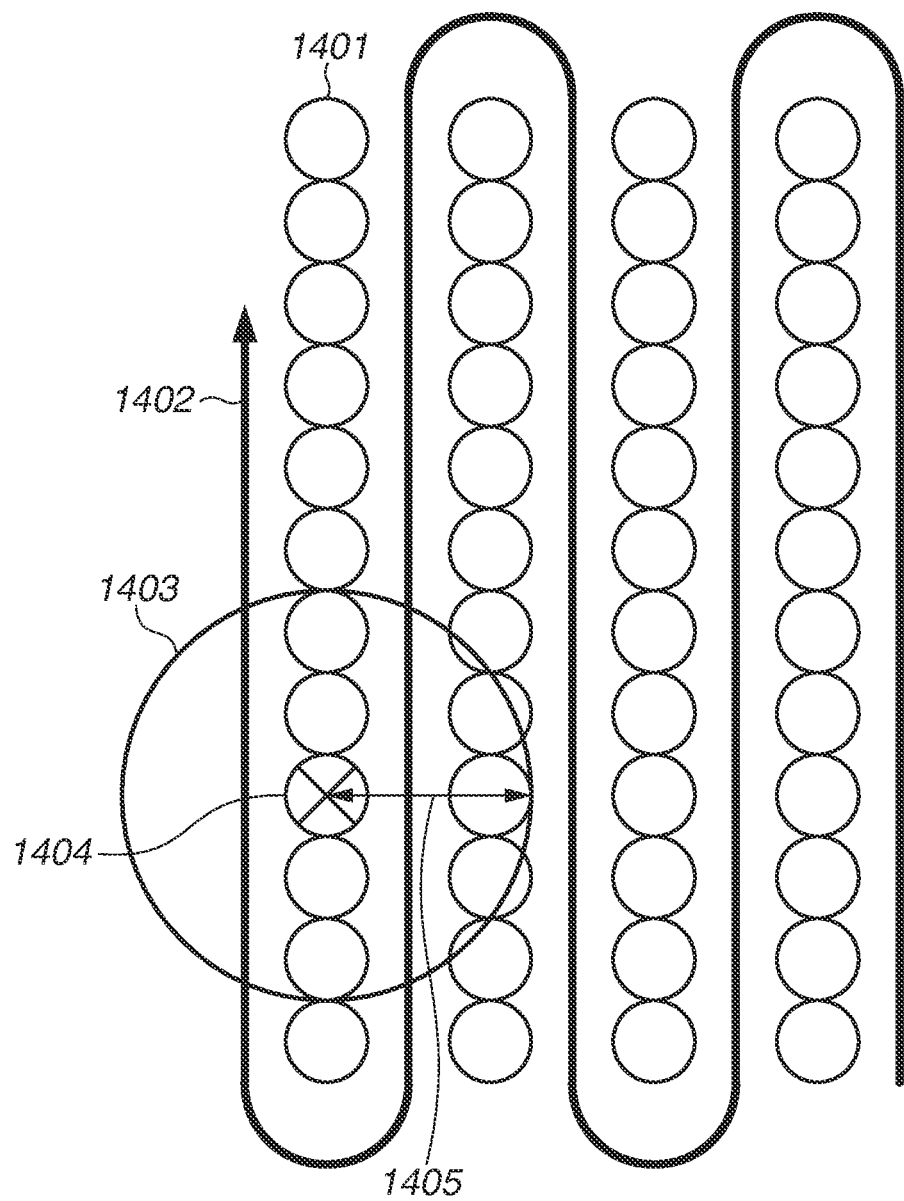
FIG. 14 is a diagram illustrating image-capturing executed according to a travelling route, an occurrence position of disease, and a range of precise investigation.

In a farm field as illustrated, for example, in FIG. 14, where crops are cultivated and form ridges in a plurality of rows, work efficiency of comprehensively capturing images of the crops can be improved if the image-capturing apparatus 100 captures images by moving in one direction, such as a travelling route 1402, while repeatedly reciprocating in a direction orthogonal to the one direction. However, if an attention target is detected at one spot in a farm field that spreads out two-dimensionally, images which are captured within a specified range regarded as a vicinity of the attention target exist discretely when these images are viewed one-dimensionally in the image-capturing order on the travelling route 1402. This is because the image-capturing apparatus 100 is likely to come closer to a same spot a plurality of times. If the attention target is detected in the above-described state, it is difficult to specify a notable image through a conventional method based on the antero-posterior relationship between image-capturing times. On the contrary, the above-described first and the second exemplary embodiments are particularly effective in the above-described farm field where crops are cultivated to form ridges in a plurality of rows.

As illustrated in FIG. 14, according to the image-capturing apparatus 100 according to the first and the second exemplary embodiments, when images of crops 1401 are captured along the travelling route 1402, precise images can be saved with respect to only a precise investigation required range 1403 based on a detecting position 1404 where disease or a pest insect is detected. On the other hand, low-resolution images that require small memory capacity are saved with respect to the rest of area, so that an amount of saved data can be reduced. In other words, in the image-capturing apparatus 100 according to the first and the second exemplary embodiments, acquisition of a high-resolution image and adjustment of a data amount of the image suitable for the attention target can be executed, based on the two-dimensional image-capturing range determined by a distance from the attention target or the number of unit areas. In the above-described exemplary embodiments, after image-capturing is ended, an image is converted and saved as necessary. However, the image may be saved after being converted while image-capturing is being executed as necessary. A flow of processing to be executed in the above-described state will be described.

The processing for converting an image into an image of low-resolution with small memory capacity can be executed with respect to at least a part of the images stored in the first storage unit 203 if it is possible to specify an image that is not affected by the attention target detected in an image captured later. For example, in the first exemplary embodiment, the attention target detected in the captured image is previously defined by the precise investigation specification table 600. Accordingly, attention is focused on the influence range having a maximum distance of the influence ranges stored in the column 604 of the precise investigation specification table 600, so that an image-capturing position of an unaffected image can be specified even if the attention target of any type is detected in the image to be captured subsequently.

A specific example will be described with reference to FIG. 14. From among the influence ranges stored in the column 604 of the precise investigation specification table 600, an influence range having the maximum distance is expressed as "Dmax". In the example illustrated in FIG. 6, a radius of influence of 5m corresponds to "Dmax". In FIG. 14, the image-capturing apparatus 100 follows the travelling route 1402 in a direction from right to left on the sheet face to capture images of, at predetermined intervals, crops 1401 which form ridges in a plurality of rows. For example, if a radius 1405 of a precise investigation required range 1403 based on a detecting position 1404 corresponds to "Dmax", a distance from a portion of the crops 1401 on the right side by two rows or more (i.e., in the past direction in order of image-capturing time) to an image-capturing position of an image to be captured later is greater than "Dmax". Accordingly, if an image captured at a position on the right side, separated from the latest position (e.g., detecting position 1404) of the image-capturing apparatus 100 by two rows or more, is extracted from the first storage unit 203, data capacity of that extracted image can be adjusted by using the information about the attention target detected up to that point of time. In other words, if processing corresponding to the processing in S306 of the flowchart in FIG. 3 is executed on the extracted image, data capacity of a part of the images can be reduced before image-capturing of all of the crops 1401 is ended. Thus, it is possible to reduce the memory capacity of the first storage unit 203 required for temporarily storing the unprocessed images.

Herein, for the convenience of referring to the drawings, a position is described by using expression of "right" and "left". However, practically, similar to the processing in S707, a range of the image-capturing position of the extracted image may be determined based on the position information. Further, an extraction method may be such that images which correspond to one row of crops regarded as a processing target are extracted every time the image-capturing apparatus 100 completes image-capturing of one row.

Further, for example, depending on the operation status of the farm field, a sampling position (e.g., specified tree) where sampling investigation is executed may be previously determined for each of the attention targets. In this case, an area included in the influence range can be previously specified with respect to each of the sampling positions. Accordingly, an image captured at a position that is not included in the influence range of any of the sampling positions can be saved as a low-resolution image when image-capturing is performed. Further, if the attention target is not detected through the sampling investigation, data capacity of the image captured within the influence range of the investigated sampling position can also be reduced. In this case, data capacity of a part of images can be reduced before image-capturing of all of crops is completed. Accordingly, with respect to a part of the images, the memory capacity of the first storage unit 203 required for temporarily storing the unprocessed images can be reduced.

In the above-described exemplary embodiments, although the attention target is detected in the image captured by the image-capturing apparatus, the attention target may be detected in the image separately received from an external apparatus.

In the above-described exemplary embodiments, resolution for saving an image is adjusted. However, a configuration may be such that an image-capturing interval is shortened, or a frame rate is increased, with respect to a range which requires precise investigation, whereas an image-capturing interval is extended, or a frame rate is lowered, with respect to the rest of the range.

In each of the above-described exemplary embodiments, a range which requires precise investigation is determined based on only the attention target detected when the latest image-capturing is executed. However, the range which requires precise investigation may be determined based on a group of attention targets detected when image-capturing is executed one or more times at optional timings.

In the above-described exemplary embodiments, a symptom of disease of crops or a pest insect is described as the attention target by taking a field of agriculture as an example. However, some embodiments are also applicable to attention targets in fields other than agriculture.

Some embodiments can be achieved by the processing in which a program to perform one or more functions according to the above-described exemplary embodiments is supplied to a system or an apparatus via a network or a storage medium, so that one or more processors in the system or the apparatus read and execute the program. Further, some embodiments can also be realized with a circuit (e.g., application specific integrated circuit (ASIC)) that performs one or more functions.

The above-described exemplary embodiments are merely examples, and do not limit the technical range of all embodiments. In other words, some embodiments can be realized in diverse ways without departing from the technical spirit or main features of the present disclosure.

According to an aspect of some embodiments, it is possible to store a high-resolution image suitable for an object or an event which is likely to affect a positional range, while reducing a data amount.

OTHER EMBODIMENTS

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-196077, which was filed on Oct. 17, 2018 and which is hereby incorporated by reference herein in its entirety.

What is claimed is:

1. An image processing apparatus comprising:
   an acquisition unit configured to acquire images each of which is an image having a first data amount acquired through image-capturing;
   a detection unit configured to detect an attention target in the images acquired by the acquisition unit;
   a specification unit configured to specify a geographical range based on a geographical position where the detected attention target exists; and
   a conversion unit configured to convert an image of at least a part of the images into an image having a second data amount that is smaller than the first data amount according to an inclusion relationship between the specified geographical range and a geographical position where each of the images having the first data amount is acquired.

2. The image processing apparatus according to claim 1, further comprising:
   a storage unit configured to store the images; and a position detection unit configured to detect an image-capturing position where each of the images is captured;

wherein the geographical position is an image-capturing position which the position detection unit detects with respect to each of the images, and wherein the conversion unit converts an image of at least a part of the images that are stored in the storage unit and are captured at an image-capturing position that is not included in the geographical range into an image having the second data amount smaller than the first data amount.

3. The image processing apparatus according to claim 2, wherein the detection unit detects the attention target in the captured image and acquires information indicating a geographical position where the attention target exists based on an image-capturing position which the position detection unit detects with respect to the image.

4. The image processing apparatus according to claim 3, further comprising a unit configured to store a position where the detection unit detects the attention target.

5. The image processing apparatus according to claim 1, wherein the conversion executed by the conversion unit is processing for lowering resolution of the captured images.

6. The image processing apparatus according to claim 1, wherein the images are continuously captured by a mobile image-capturing apparatus at a constant time interval.

7. The image processing apparatus according to claim 6, wherein the conversion executed by the conversion unit is processing for decimating the captured images.

8. The image processing apparatus according to claim 6, wherein the conversion executed by the conversion unit is processing for lowering resolution of the captured images and processing for decimating the captured images.

9. The image processing apparatus according to claim 1, wherein the specification unit specifies a geographical range where a target that is affected by the attention target exists, based on a geographical position where the attention target exists, and wherein the conversion unit converts an image of at least a part of the images that are acquired from a position that is not included in the specified geographical range into an image having the second data amount that is smaller than the first data amount.

10. The image processing apparatus according to claim 9, wherein the specification unit determines a data amount to be reduced according to a type of the attention target.

11. The image processing apparatus according to claim 9, wherein the specification unit further specifies a range where the data amount is to be reduced based on a distance to the detected attention target.

12. The image processing apparatus according to claim 9, further comprising an end point detection unit configured to detect an end point of a unit area, wherein the specification unit specifies a range where the data amount is to be reduced based on an end point of a unit area detected by the end point detection unit.

13. The image processing apparatus according to claim 1, wherein the images are acquired by comprehensively capturing the crops through an image-capturing apparatus moving within a farm field where crops are arranged to form ridges in a plurality of rows.

14. The image processing apparatus according to claim 13, wherein the images are continuously captured at a constant time interval through an image-capturing apparatus travelling on a route that makes the image-capturing apparatus come close to one spot a plurality of times.

15. The image processing apparatus according to claim 13, wherein the attention target is at least any one of a portion of the crops having a symptom of disease or a pest insect.

16. The image processing apparatus according to claim 14, wherein the conversion unit executes the conversion when image-capturing of all of the crops existing in all or a part of a range in the farm field defined as an investigation target is ended.

17. The image processing apparatus according to claim 14, further comprising a storage unit configured to store the images, wherein, before image-capturing of all of the crops existing in all or a part of the range in the farm field defined as the investigation target is ended, the conversion unit executes processing for converting an image at least a part of the mages that are stored in the storage unit and are extracted based on a latest position of the image-capturing apparatus into an image having the second data amount that is smaller than the first data amount.

18. The image processing apparatus according to claim 1, wherein the image processing apparatus is used for executing processing for outputting information which enables a user to grasp a growing condition of crops or damage caused by disease or pest insects, by capturing images of a farm field and crops and analyzing the captured images.

19. An image processing method executed by an image processing apparatus, the image processing method comprising:

acquiring images each of which is an image having a first data amount acquired through image-capturing;

detecting an attention target in each of the images;

specifying a geographical range based on a geographical position where the detected attention target exists; and converting an image of at least a part of the images into an image having a second data amount that is smaller than the first data amount according to an inclusion relationship between the specified geographical range and a geographical position where each of the images having the first data amount is acquired.

20. A non-transitory computer-readable storage medium storing a computer program for causing a computer to execute an image processing method, the image processing method comprising:

acquiring images each of which is an image having a first data amount acquired through image-capturing;

detecting an attention target in each of the images;

specifying a geographical range based on a geographical position where the detected attention target exists; and converting an image of at least a part of the images into an image having a second data amount that is smaller than the first data amount according to an inclusion relationship between the specified geographical range and a geographical position where each of the images having the first data amount is acquired.

* * * * *